Aug. 8, 1972   J. H. SMITH   3,682,738
METHODS AND APPARATUS FOR DEPOSITING POWDERED
MATERIALS IN PATTERNED AREAS
Filed Sept. 3, 1969   4 Sheets-Sheet 1
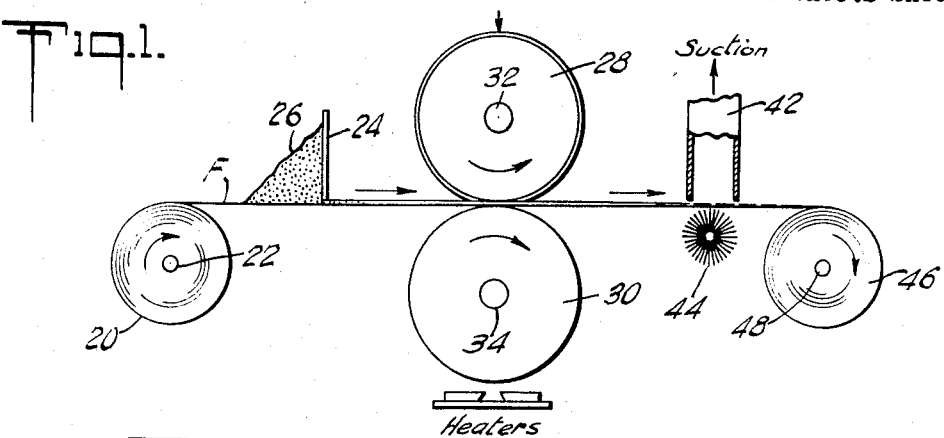
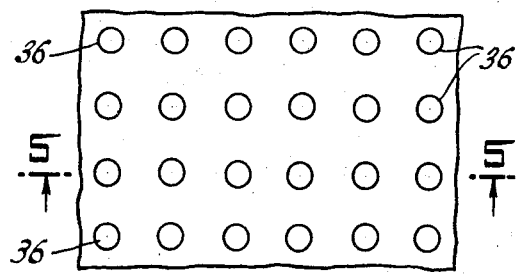
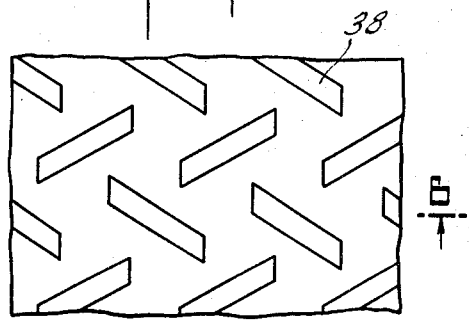
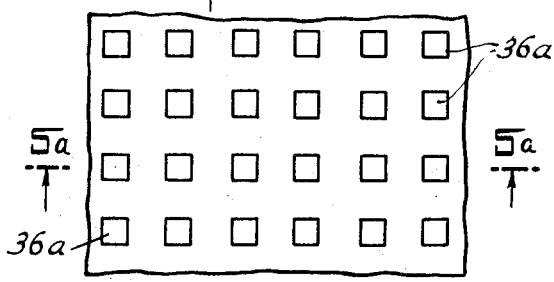
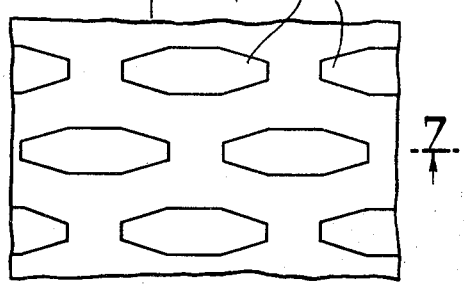
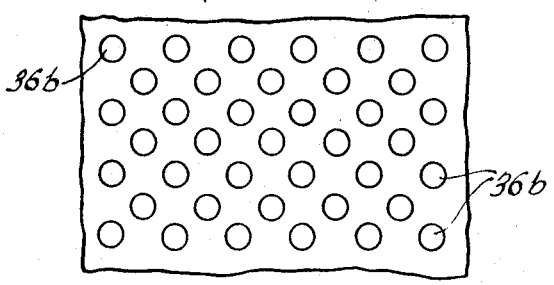
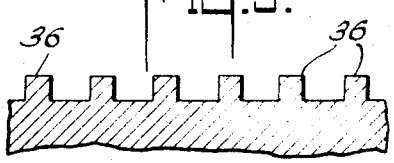
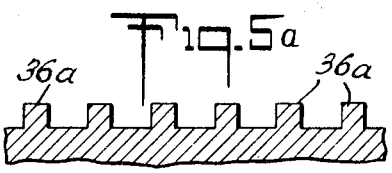
INVENTOR   J. HAROLD SMITH
BY Alexander T. Kardos, ATTORNEY Aug. 8, 1972  J. H. SMITH  3,682,738
METHODS AND APPARATUS FOR DEPOSITING POWDERED
MATERIALS IN PATTERNED AREAS
Filed Sept. 3, 1969  4 Sheets-Sheet 2
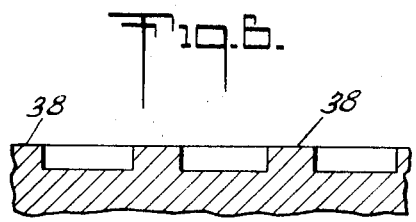
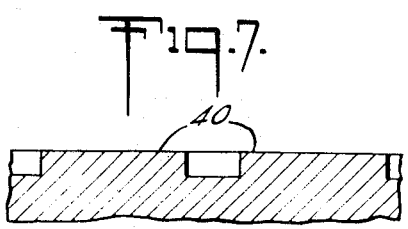
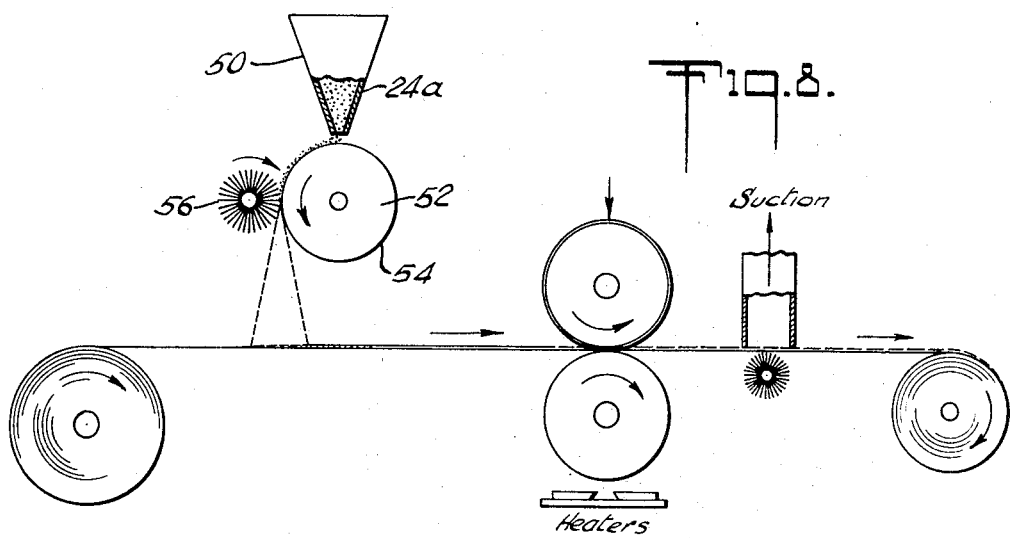
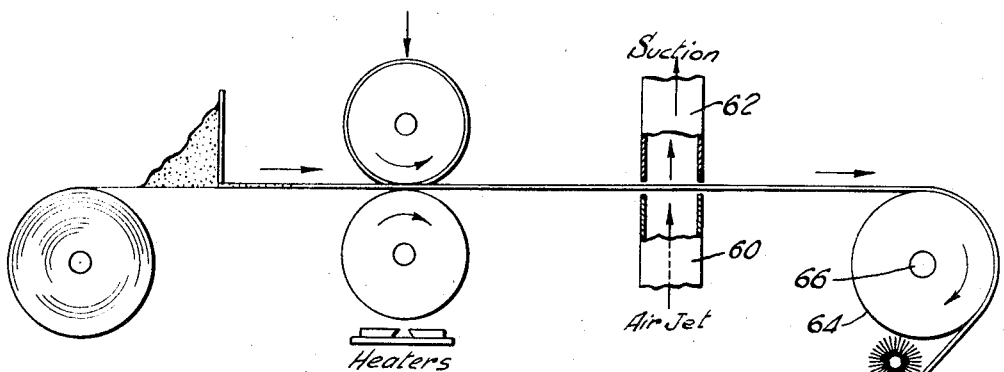
INVENTOR:
J. HAROLD SMITH
BY
Alexander T. Kardos
ATTORNEY

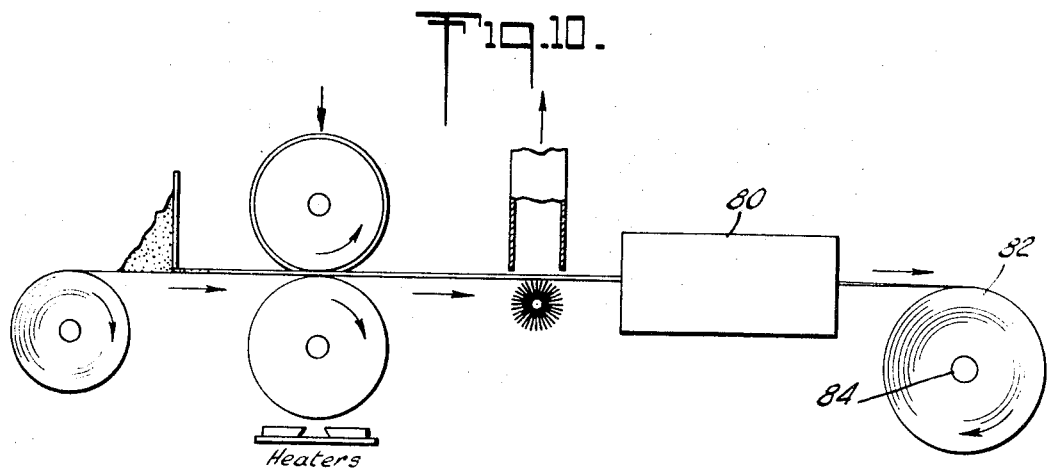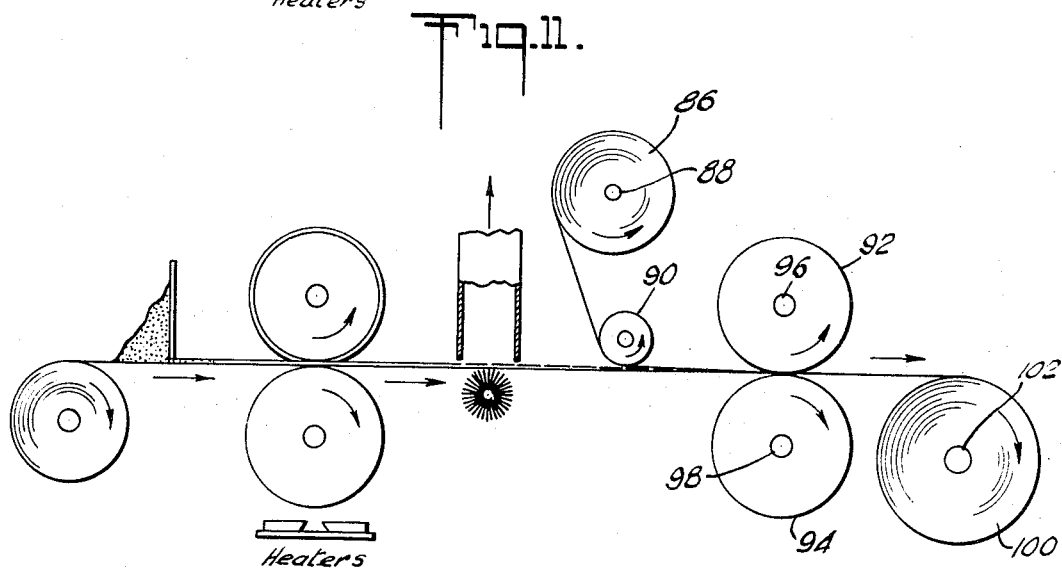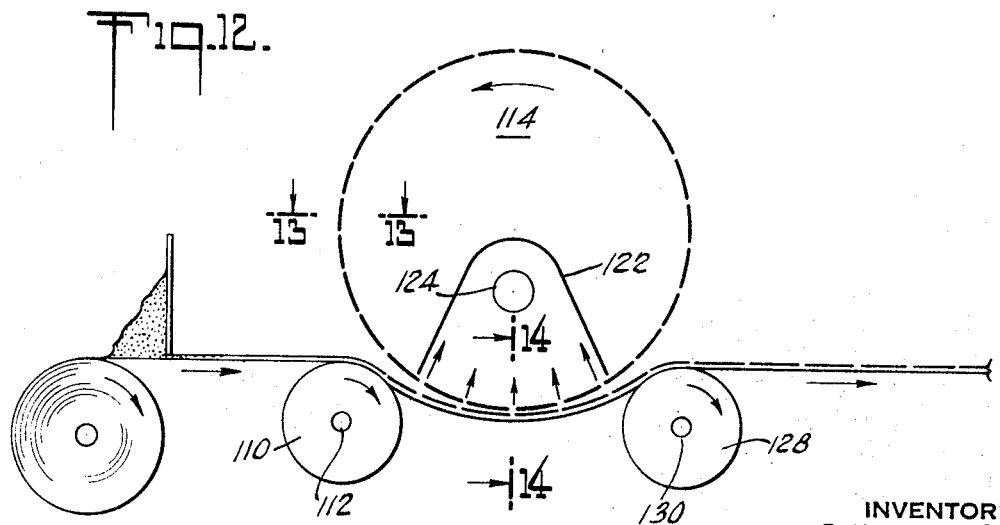

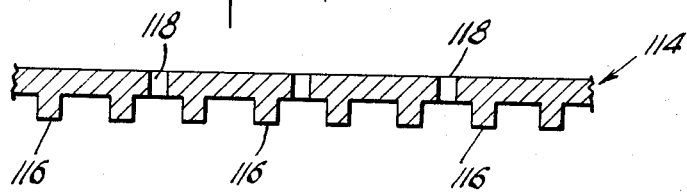
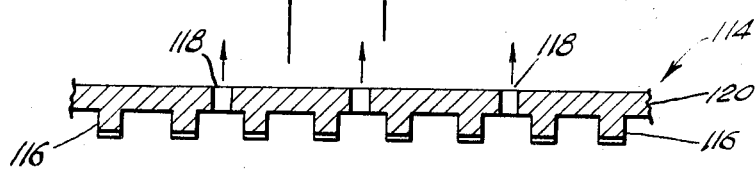
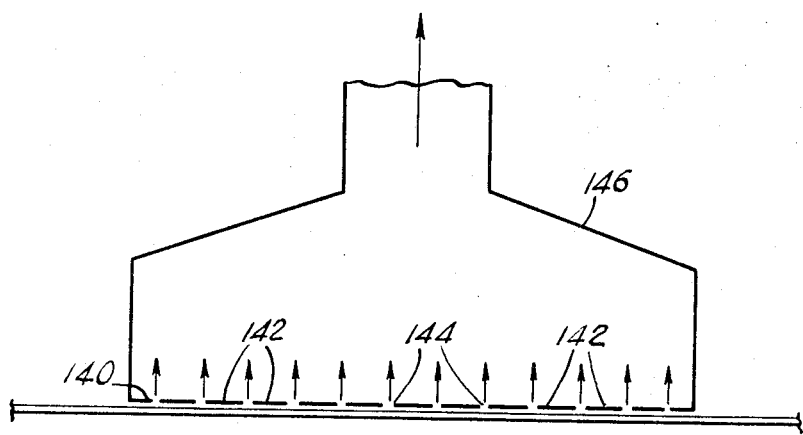

United States Patent Office 3,682,738
Patented Aug. 8, 1972

---

3,682,738
METHODS AND APPARATUS FOR DEPOSITING POWDERED MATERIALS IN PATTERNED AREAS
J. Harold Smith, Amherst, Mass., assignor to Johnson & Johnson
Filed Sept. 3, 1969, Ser. No. 854,837
Int. Cl. B32b 31/12, 31/20
U.S. Cl. 156—283
10 Claims

ABSTRACT OF THE DISCLOSURE

Methods and apparatus for depositing powdered thermoplastic materials in patterned areas on textile or other sheet materials which comprise depositing powdered thermoplastic materials substantially uniformly in over-all fashion on textile or other sheet materials; pressing the powdered thermoplastic materials against the textile or other sheet materials only in the desired patterned areas with sufficient pressure to compact and densify and, if desired, to soften the powdered thermoplastic materials and to cause it to adhere to the textile or other sheet materials only in the patterned areas without affecting the powdered materials in the areas other than the patterned areas; and removing the powdered thermoplastic materials from the textile or other sheet materials in the areas other than the patterned areas.

---

The present invention relates to methods and apparatus for applying and adhering powdered thermoplastic materials in patterned areas to textile or other sheet materials. More specifically, the present invention relates to methods and apparatus for applying and adhering powdered thermoplastic bonding agents in patterned areas to textile materials whereby the bonding agents are capable of bonding the fibers of the textile materials into more self-sustaining, stabilized structures, or are capable of bonding the textile materials to other materials.

It has often been desired heretofore to deposit powdered thermoplastic materials or other bonding agents on textile or other sheet materials in selected patterned areas only and to adhere said powdered thermoplastic materials in place in these selected patterned areas so that they may serve desired bonding, adhering, laminating, decorative, or other purposes and uses thereafter. Unfortunately, such powdered materials are difficult to handle and process, primarily because of their fine particulate nature and their tendency to dust or to be easily moved from their originally selected patterned areas before they can be adhered more or less permanently thereto.

The use of rotating drums or other containers filled with the powdered materials and provided with apertures in their surfaces corresponding to the patterned areas has been tried previously and such rotating devices have deposited powdered materials in a fairly satisfactory manner through such apertures on textile materials passing in contact therewith. Such procedures and other processes are disclosed in U.S. Pats. 2,820,716 and 3,002,849 which issued Jan. 21, 1958 and Oct. 3, 1961, respectively. However, such prior art procedures leave much to be desired and improvements thereover have been sought for a long time.

It has now been discovered that powdered thermoplastic materials may be deposited and adhered to selected patterned areas on textile or other sheet materials by depositing the thermoplastic materials substantially uniformly over the surface of the textile or other sheet materials; then pressing the powdered thermoplastic materials against the textile or other sheet materials only in the patterned areas with sufficient pressure to compact and densify and, if desired, to soften the powdered thermoplastic materials and to cause them to adhere to the textile or other sheet materials only in the selected patterned areas without affecting the powdered materials in the areas other than the patterned areas; and removing that portion of the powdered thermoplastic materials from the textile or other sheet materials in those areas other than the selected pattern areas.

Such techniques are highly advantageous due to the simplicity and ease of the processing involved, the sharp definition and precise locating of the patterned areas on the textile or other sheet materials, the ability to control precisely the amount and location of powdered materials applied, the effectiveness and trouble-free nature of the operation, and the flexibility of selection of materials and patterns capable of utilization.

Other advantages and features of the present invention will become clear from a consideration of the following specification and claims, taken in view of the appended drawings wherein:

FIG. 1 is a schematic drawing showing the basic principles of operation of the present invention;

FIGS. 2, 2a, 2b, 3 and 4 are fragmentary schematic drawings showing five different patterned areas on the surface of the embossing roll;

FIGS. 5, 5a, 6, 7 are fragmentary schematic cross-sectional drawings taken on the lines 5—5, 5a—5a, 6—6, and 7—7 of FIGS. 2, 2a, 3, and 4, respectively;

FIG. 8 is a schematic drawing showing a modification of the application of the powdered materials to the textile materials;

FIG. 9 is a schematic drawing showing several modifications of methods and apparatus for removing the excess powdered materials from the textile materials;

FIG. 10 is a schematic drawing showing a modification of the present invention involving an added heat or prefusion treatment of the fabric with the powdered materials in patterned areas thereon;

FIG. 11 is a schematic drawing showing a modification of the present invention involving a direct laminating utilization of the fabric with the powdered materials in patterned areas thereon;

FIG. 12 is a schematic drawing of a modification of the present invention involving a combination of more than one function into one procedural step;

FIG. 13 is a fragmentary schematic cross-sectional drawing taken on the line 13—13 of FIG. 12 in the direction indicated;

FIG. 14 is a fragmentary schematic cross-sectional drawing taken on the line 14—14 of FIG. 12 in the direction indicated; and FIG. 15 is a schematic drawing of a modification of the present invention involving a combination of more than one function into one procedural step.

With reference to FIG. 1, there is shown a fabric unwind roll 20 rotatable on a shaft 22 and capable of delivering a fabric F or a sheet material for processing by the methods and apparatus of the present invention.

The fabric F is preferably a textile fabric such as, for example, a woven fabric, a nonwoven fabric, a knitted fabric, a felted fabric, etc. However, other sheet materials lend themselves to the application of the principles of the present invention. Such other sheet materials would include, for example, paper, plastic films and sheets, leather, etc.

The fabric F passes under a knife coater 24 of a conventional nature which is capable of covering the fabric F substantially uniformly with a coating of powdered materials 26. The position of the lower edge of the knife coater 24 is adjustable relative to the surface of the fabric F passing thereunder whereby the thickness of the coating of powdered materials 26 may be adjusted to any desired thickness or add-on.

The amount of powdered materials applied to the fabric F may be varied within relatively wide limits. Knife-coat applications of coating thickness of from about 0.015 inch to about 0.050 inch are usually employed, with preferred limits being from about 0.020 inch to about 0.040 inch. Such coatings will yield from about 75 grams per square yard to about 250 grams per square yard with a preferable range of from about 100 grams per square yard to about 200 grams per square yard. These figures are for overall coatings of powdered materials and it must be realized that the final amount which remains on the fabric F after processing of the powdered materials is a function of the percentage of the patterned areas of the embossing roll surface. Thus, if 100 grams per square yard of powdered materials is applied in overall fashion to the fabric and the patterned area on the embossing drum is only 20% of the total area, then a patterned coating of only 20 grams per square yard remains in the final product.

The size and shape of the patterned areas varies over extremely wide limits depending primarily on the properties and characteristics desired in the finished fabric. Five typical patterns are illustrated in FIGS. 2, 2a, 2b, 3, and 4 showing circular dots in squared formation (FIG. 2) and in staggered formation (FIG. 2b), square dots (FIG. 2a), cross-hatched parallelograms (FIG. 3), and torpedo prints (FIG. 4). Many other shapes are, of course, possible including arcuate or curvilinear shapes including annular, oval, elliptical, etc.; polygonal shapes including square, rectangular, diamond, hexagonal, etc.; special shapes such as hearts, crowns, coronets, fleur-de-lis, etc. The amount of surface coverage of such patterned areas also varies widely and may be as low as about 5% of the surface of the fabric or may be as high as about 50% but preferably fall in the range of from about 10% to about 35%.

The particle size of the granules of powdered materials also varies within relatively wide limits depending to a great extent upon the size and shape of the patterned areas, the fineness and surface coverage thereof, etc. Particle sizes falling in the range of from finer than about 20 mesh (0.033 inch or 0.84 mm. openings—U.S. Standard Sieve) to finer than about 100 mesh (0.006 inch or 1.15 mm. opening—U.S. Standard Sieve) is suitable for the purposes of the present invention, with larger or smaller sizes suitable for special applications.

Preferably, however, a particle size range of from finer than about 40 mesh (0.016 inch or 0.42 mm.—U.S. Standard Sieve Size) to finer than about 70 mesh (0.008 inch or 0.21 mm.—U.S. Standard Sieve Size) is more commercially desirable.

The term "finer than about" 20 mesh, for example, as used herein, means that substantially all of the granules used will pass through a 20 mesh screen or sieve and therefore includes materials very much smaller than 20 mesh. No coarser materials are included, however, for the major purposes of the present invention.

The chemical nature of the powdered materials is preferably such that they possess relatively low softening temperatures as well as relatively low melting or fusing temperatures. They must, of course, be plastic or moldable at normal operating temperatures and, as such, normally comprise thermoplastic materials or ultimately thermosetting materials, provided they are still in a thermoplastic or moldable stage. Synthetic resins such as polyolefins, particularly polyethylene and polypropylene; polyamides including Nylon 6, Nylon 6/6, Nylon 11, Nylon 12, Nylon 6/10, and copolymers thereof cellulosic derivatives such as cellulose acetate, cellulose acetate butyrate, etc.; polyesters; vinyl compounds including homopolymers and copolymers derived from vinyl chloride, vinyl acetate, etc.; polymers and copolymers of acrylic resins; etc. Blends of these resins in varying proportions frequently yield very desirable properties and characteristics. Plasticized resins, particularly plasticized polyvinyl chloride and cellulose acetate, are of excellent applicability.

The fabric F with the coating of powdered materials 26 thereon passes through the nip of rolls 28 and 30 rotating on shafts 32 and 34. Roll 28 is a pressure embossing roll and is provided with raised or embossed patterned areas such as illustrated, for example, in FIGS. 2, 2a, 2b, 3 and 4 and their corresponding cross-sectional views FIGS. 5, 5a, 6 and 7. More specific details of these and other patterns will be set forth hereinafter. It is sufficient at this time to explain that the lands 36, 36a, 36b, 38 or 40 of the embossing roll press the powdered materials 26 on the fabric F with sufficient pressure against the backing roll 30 that the granules or particles of the powdered materials 26 compact and densify and, if desired, soften and adhere to each other and to the fabric F. The depth of the lands on the embossing roll is in the range of from about 0.020 inch to about 0.100 inch and preferably from about 0.030 inch to about 0.0625 inch.

The embossing roll is preferably made of a metal, such as steel, brass, bronze, aluminum, etc., but hard rubber or similar materials may be used provided the patterned areas can be formed therein. If desired, the embossing roll may be a smooth surfaced cylindrical metallic roll and may be provided with a Teflon or similar synthetic resin coating or sleeve in which the desired embossed patterned areas are formed. The embossing roll is preferably operated cold or at room temperature in order to avoid powder release problems, although a low degree of heat may be tolerated and would not be objectionable.

The backing roll 30 is a smooth-surfaced rubber or metallic cylindrical roll and may also be operated cold or at room temperature, if so desired, whereby substantially only a compacting or densifying of the powdered materials is obtained. However, inasmuch as the backing roll 30 is on the fabric side of fabric F and does not directly contact the powdered materials 26, whereby fabric or powder release problems are not a critical factor, an elevated surface temperature of from about 160° F. to about 230° F. or lower or higher, if necessary, is frequently desirable for the backing roll, depending again on the nature, characteristics, and properties of the powdered materials, upon the speed of fabric feed through the apparatus, etc. The heating of the backing roll may be accomplished by conventional known means and, if resorted to, is sufficient to actually soften the powdered materials when the pressure is applied. The uncompacted powdered materials in the adjacent non-patterned areas, however, remain unaffected, free-flowing and non-tacky to all intents and purposes.

A low nip pressure between the embossing roll and the backing roll is usually adequate inasmuch as it is usually desired merely to bring about a compaction or densification of the granules of the powdered materials in the patterned areas and to avoid any compaction, densification or softening of the granules in the adjacent non-patterned areas. Normally, a nip pressure of from 10 pounds to about 100 pounds per linear inch of embossing roll length is adequate, although lower and higher pressures per linear inch may be used, depending upon the nature, properties and characteristics of the powdered materials being used, upon the speed of fabric feed through the apparatus, and upon whether or not elevated temperatures are involved in the embossing operation.

The fabric F with the powdered materials adhered thereto in the patterned areas only then passes under a suction or vacuum device 42 which removes and draws upwardly the powdered materials which have not been adhered to the fabric F. If desired, a gentle vibrating or agitating device, such as a rotating brush mechanism 44, may be used to shake loose all the powdered materials not adhered to the fabric F so that the suction device 42 is assisted in its powder-removal function. The powdered materials so removed may be recycled and re-used inasmuch as they have not been exposed to the pressure embossing softening treatment and are still unaffected, free-flowing and non-tacky and suitable for re-use. The fabric F with the powdered materials adhered thereto may then be forwarded and wound on a fabric rewind roll 46 rotating on a driving shaft 48 and used subsequently, as desired.

It is not essential that a knife-coater 24, as noted in FIG. 1, be employed to cover the fabric with a substantially uniform coating of the powdered materials. Many other devices may be employed to perform a similar function and one such device is illustrated in FIG. 8. A hopper 50 is employed and contains a supply of the powdered materials 24a which exit therefrom by means of an adjustable narrow slot in the bottom thereof. The powdered materials 24a drop onto a relatively slowly rotating drum 52 provided with a roughened surface 54 such as a sandpaper finish. A rotatable brush 56 rotating at a greater peripheral speed brushes the powdered materials from the surface of the slower rotating drum 52 and the powdered materials fall in cloud-like fashion upon the fabric moving thereunder.

Similarly, it is not essential that a suction or vacuum device as specifically illustrated in FIG. 1 be used to remove the excess powdered materials. Many other devices are utilizable and some are shown in FIG. 9. An air jet 60 positioned under the fabric may be used by itself or in conjunction with a suction or vacuum device 62 to remove the excess powdered materials for recycling and re-use, if desired. Or, the fabric may be trained over a direction-changing roll 64 rotating on a shaft 66 whereby the excess powdered materials drop from the fabric by the action of gravity. A rotatable brush 68 may be used to gently vibrate or agitate the fabric to insure more complete removal of the excess powdered materials. The fabric may then be rewound on a fabric rewind roll 70 rotating on a shaft 72.

In some cases, it is desired that the patterned areas of powdered materials be more strongly adhered to the fabric to prevent the possibility of the powdered materials being subsequently inadvertently removed from the fabric by rough handling, rubbing, scraping, etc. To avoid this, apparatus illustrated in FIG. 10 is employed wherein a pre-fusion oven 80 is provided at a point in the fabric travel after the excess powdered material has been removed from the non-patterned areas. The temperature ranges of the pre-fusion oven are in the range of from about 160° F. to about 320° F. and are, of course, higher than the temperature ranges which exist at the embossing roll. The oven may be adjusted to range up to the melting or fusing temperature of the specific granules of powdered materials being used, if so desired. After pre-fusion, the fabric may be forwarded to a fabric rewind roll 82 rotating on a shaft 84. The granules are more firmly adhered to the fabric and more strongly resist removal therefrom.

Such use of a pre-fusion oven is particularly advantageous whenever only pressure is used at the embossing roll and no heat is applied thereat by the backing roll. In such a case, the granules in the patterned areas are compacted and densified but not softened at that point and adherence to the fabric, although satisfactory, may not be sufficient to withstand subsequent rough handling, rubbing, scraping, etc. especially if the fabric is to be rewound and not used for some time.

However, when the pre-fusion oven applies heat to the granules, softening takes place and greater adherence of the granules to the fabric is obtained but such softening takes place after the excess granules in the non-patterned areas have been removed and there is no danger of undesirable granule adherence in the non-patterned areas. As a result, the disadvantages of granule adherence in the non-patterned areas are avoided since the granules thereat were removed prior to the application of the heat by the pre-fusion oven, and the possibility of the danger of inadvertent granule removal in the patterned area is decreased because the adherence of the granules in these patterned areas is increased.

The advantages of the pre-fusion oven, however, are also present when heat is applied at the embossing roll, although perhaps to a lesser extent.

It is, of course, desirable in many instances that the fabric with the powdered materials adhered thereto in patterned areas be used directly for purposes of bonding, adhering, laminating, etc., whereby the intermediate step of rewinding is omitted. One such direct procedure is illustrated in FIG. 11 wherein a laminating fabric is unwound from a roll 86 rotating on a shaft 88 and is passed under a directional guide roll 90 which positions it on the fabric having the powdered materials in patterned areas thereon. The laminated fabric construction is then forwarded and passes between the nip of pressure-applying laminating rolls 92 and 94 rotating respectively on shafts 96 and 98. Either or both of the laminating rolls 92 and 94 are heated by conventional means (not shown) to the melting and fusing temperature of the powdered materials and press the layers of fabrics into an integral, self-sustaining bonded laminated fabric construction. The bonded laminate is then forwarded to and wound on a laminate wind roll 100 rotating on a shaft 102. It is, of course, to be appreciated that many other specific forms of apparatus are available to carry out the laminating function and the specific apparatus disclosed herein in FIG. 11 is merely illustrative and not limitative of the inventive concept.

In the variations and modifications of the invention illustrated and described thus far, the pressures embossing of the powdered materials in the patterned areas has always taken place in a separate operation prior to the subsequent removal of the excess powdered materials in the non-patterned areas. This is not essential and it is possible to remove the excess of the powdered materials from the non-patterned areas while literally at the same time holding the powered materials in place in the patterned areas. Apparatus and a method for accomplishing this is illustrated in FIGS. 12–14 and is described as follows:

After the substantially uniform coating of powdered materials is applied to the fabric by any of the herein described methods, such as a knife-coater, the fabric is passed into the nip of a directional guide roll and pressure applying roll 110 rotating on a shaft 112 and a large hollow embossing drum or roll 114. The hollow drum 114 possesses embossed patterned areas 116 on its peripheral cylindrical surface similar to the patterned areas disclosed hereinbefore and also possesses a plurality of air vents 118 which penetrate the outer cylindrical shell 120 of the drum 114. These vents 118 are adapted to communicate with a large stationary suction hood 122 in the interior of drum 114 wherein a suction or partial vacuum is created by a suction pipe 124.

Consideration of FIGS. 12–14 will reveal that the fabric and the powdered materials thereon have pressure (and heat, if so desired), applied thereto at the nip of roll 110 and drum 114 to soften the powdered materials in the patterned areas only. Continued rotation of the drum 114 causes the air vents 118 to communicate with the interior of the suction hood 122 within the drum 114 whereby the excess powdered materials in the non-pattern areas are removed from the fabric. Continued rotation of the drum 114 moves the fabric over directional exit guide roll 128 rotating on shaft 130 and the fabric is then forwarded for further handling, processing, etc., or wind up on a rewind roll (not shown).

FIG. 15 illustrates another version of the combined function approach of FIGS. 12–14. An embossing plate 140 is provided with embossed patterned areas 142 which apply pressure to the fabric and powdered materials thereon which is positioned thereunder. The powdered materials are softened and adhere to the fabric, as disclosed previously. The excess powdered materials are then removed through air holes or vents 144 in the embossing plate 140 by suction hood 146 and the embossing operation and the removal of excess powdered materials is accomplished at one station of the manufacturing process.

The invention will be further described by reference to the following specific examples which are included for illustrative purposes and not for limitative purposes.

EXAMPLE 1

The apparatus disclosed in FIG. 1 of the drawings is used in this example. The fabric employed is a 64 x 56 cotton print fabric. The powdered materials are finer than 50 mesh and are low melting polyamides (Platamid Nylon H 105 P—a copolymer of lauric lactam with caprolactam and minor amounts of other polyamide forming materials) which are applied substantially uniformly to the surface of the fabric in an amount of about 100 grams per square yard. The print pattern on the 18" embossing roll is a uniformly-spaced square pattern of 8 x 8, square dots, with each square dot measuring 1/16" x 1/16". Area coverage of the dots is 25% of the total area. The temperature of the embossing roll is room temperature. The temperature of the back up roll is 230° F. The speed of the fabric through the apparatus is 7 yards per minute. The excess powdered materials are removed by suction means, leaving approximately 25 grams of the powdered materials per square yard of fabric. Such powdered materials are located solely in the square dot pattern which is sharp and clear. The fabric is well suited as a fusible backing fabric.

EXAMPLE 2

The procedures of Example 1 are followed substantially as set forth therein except that the speed of the fabric through the apparatus is increased to 35 yards per minute. The results are comparable and the resulting fabric with the powdered materials adhered thereto in the 8 x 8 square dot pattern which is clear and sharp and is well suited as a fusible backing fabric.

EXAMPLES 3-5

The procedures of Example 1 are followed substantially as set forth therein except that the cotton print fabric is replaced by (a) a relatively more open rayon/cotton fabric measuring 5.50 yards per pound; (b) a more lofty cotton flannel fabric measuring 5.06 yards per pound; and (c) a hair cloth fabric. The results are comparable and the resulting fabrics with the powdered materials adhered thereto in the 8 x 8 square dot pattern which is clear and sharp and are well suited as fusible backing fabrics.

EXAMPLES 6-8

The procedures of Example 1 are followed substantially as set forth therein except that patterns selected are shown in FIGS. 2b, 3 and 4. FIG. 2b is a 256-diamond dot, 16 x 16 per square inch staggered pattern with a surface coverage of 35%. FIG. 3 is a cross-hatch parallelogram pattern, each parallelogram having a length of 0.34 inch, a width of 0.05 inch, an angularity to the long direction of 60°, and an area coverage of 23%. FIG. 4 is a torpedo print pattern, each torpedo having a length of 0.180 inch, a maximum width of 0.022 inch, a minimum width of 0.012 inch, an angularity of 3°11', and a surface coverage of 11.8%. The amounts of powdered materials applied in overall fashion are: 120 grams per square yard; 100 grams per square yard; and 80 grams per square yard, respectively. The surface coverage of the patterned areas are 42%, 23% and 9% of the fabric area, respectively.

The results are comparable and the resulting fabrics with the powdered materials adhered thereto in clear and sharp patterned areas are well suited as fusible backing fabrics.

EXAMPLES 9-12

The procedures of Example 1 are followed substantially as set forth therein except that the following powdered materials are used: (1) Schaetti nylon 5000, a very low melting resin comprising a highly plasticized copolymer of hexamethylenediamine-sebacic acid with caprolactam and lauric lactam; (2) Schaetti nylon 5010, a low melting resin comprising a plasticized copolymer of hexamethylenediamine-sebacic acid with caprolactam and lauric lactam; (3) branched chain polyethylene having a low density of 0.912 and a high melt index of 70; and (4) plasticized cellulose acetate.

The results are comparable and the resulting fabrics with the powdered materials adhered thereto in clear and sharp patterned areas are well suited as fusible backing fabrics.

EXAMPLE 13

The procedures of Example 1 are followed substantially as set forth therein except that the speed of the fabric through the apparatus is increased to 60 yards per minute and the temperature of the backing roll is increased to 245° F. The results are comparable and the resulting fabric with the powdered materials adhered thereto in the 8 x 8 square dot pattern which is clear and sharp and is well suited as a fusible backing fabric.

EXAMPLE 14

The procedures of Example 1 are followed substantially as set forth therein except that the backing roll is operated at room temperature whereby only compaction and densification of the granules takes place at the embossing stage. The granules, however, are adhered well to the fabric but it is noted that rubbing and scraping of the fabric does result in the removal of some of the granules. The fabric, however, is still considered satisfactory and acceptable as a heat fusible backing fabric.

EXAMPLE 15

The procedures of Example 14 are followed substantially as set forth therein with no heat applied at the embossing stage but a pre-fusion oven is added as illustrated in FIG. 10. The temperature of the pre-fusion oven is adjusted to 270° F. and is such that a definite softening of the granules takes place, along with an additional compaction and densification of the powdered materials. The granules are extremely well adhered to the fabric in the patterned areas and there are no excess granular materials adhered to the fabric in the non-patterned areas. The fabric is extremely well suited as a heat-fusible backing fabric.

EXAMPLE 16

The procedures of Example 1 are followed substantially as set forth therein except that a laminating fabric is applied and adhered to the base fabric by means of apparatus illuustrated in FIG. 11. The laminating fabric is a wool fabric such as used in men's suitings. The laminating takes place in desired fashion and the laminated fabric is desirably soft, flexible, possesses a good hand and drape, and is not objectionable as stiff or boardy.

Although the invention has been described with reference to specific examples disclosing the use of particular materials under closely defined operating conditions in specific apparatus, such is intended for illustrative purposes and the invention in its broader aspects is not to be construed as limited thereto, except as defined by the appended claims.

What is claimed:

1. A method of depositing powdered thermoplastic materials in desired, predetermined, preselected patterned areas on textile materials which comprises: depositing powdered thermoplastic materials substantially uniformly in overall fashion on textile materials; directly contacting and pressing said powdered thermoplastic materials on said textile materials only in the desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; and removing powdered thermoplastic materials from said textile materials in the areas other than said patterned areas whereby said textile materials are capable of being adhered to other materials in said patterned areas.

2. A method of adhering textile materials to other textile materials in desired, predetermined, preselected patterns which comprises: depositing powdered thermoplastic materials substantially uniformly in overall fashion on textile materials; directly contacting and pressing said powdered thermoplastic materials on said textile materials only in the desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; removing powdered thermoplastic materials from said textile materials in the areas other than said patterned areas; applying heat at elevated temperatures to said textile materials to melt and fuse the powdered thermoplastic materials to cause them to adhere more strongly to the textile materials after the powdered thermoplastic materials have been removed in the areas other than said patterned areas; and adhering said textile materials to other textile materials by means of heat and pressure applied to said thermoplastic materials in said patterned areas.

3. A method of depositing powdered thermoplastic materials in desired, predetermined, preselected patterned areas on textile materials which comprises: depositing powdered thermoplastic materials substantially uniformly in overall fashion on textile materials; directly contacting and pressing said powdered thermoplastic materials on said textile materials only in desired, predetermined, preselected patterned areas approximately at room temperature and merely with sufficient pressure to compact and densify but not melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; applying heat to said textile materials and said powdered thermoplastic materials adhered thereto from the side of said textile materials away from said powdered thermoplastic materials to assist in the compacting and densifying but not the melting and fusing of said powdered thermoplastic materials; and removing powdered thermoplastic materials from said textile materials in the areas other than said patterned areas whereby said textile materials are capable of being adhered to other materials in said patterned areas.

4. A method of depositing powdered thermoplastic materials in desired, predetermined, preselected patterned areas on textile materials which comprises: depositing powdered thermoplastic materials substantially uniformly in overall fashion on textile materials; directly contacting and pressing said powdered thermoplastic materials on said textile materials only in desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; removing powdered thermoplastic materials from said textile materials in the areas other than said patterned areas; and applying heat at elevated temperatures to said textile materials to melt and fuse the powdered thermoplastic materials to cause them to adhere them more strongly to the textile materials after the powdered thermoplastic materials have been removed in the areas other than said patterned areas.

5. A method as defined in claim 4 wherein the direct contact and pressing of said powdered thermoplastic materials takes place at approximately room temperature and said application of heat at elevated temperatures takes place in a range of from about 160° F. to about 320° F. and up to the melting and fusing temperature of said powdered thermoplastic materials.

6. A method of depositing powdered thermoplastic materials in desired, predetermined, preselected patterned areas on textile materials which comprises: depositing powdered thermoplastic materials substantially uniformly in overall fashion on textile materials; directly contacting and pressing said powdered thermoplastic materials on said textile materials only in desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powered materials in the areas other than said patterned areas, said compacting, densifying, and adhering being accomplished substantially solely by said application of pressure; applying heat to said textile materials and said powdered thermoplastic materials adhered thereto from the side of said textile materials away from said powdered thermoplastic materials to assist in the compacting and densifying but not the melting and fusing of said powdered thermoplastic materials; removing powdered thermoplastic materials from said textile materials in the areas other than said patterned areas; and applying heat at elevated temperatures to said textile materials to melt and fuse the powdered thermoplastic materials to cause them to adhere them more strongly to the textile mterials after the powdered thermoplastic materials have been removed in the areas other than said patterned areas.

7. A method of adhering textile materials to other textile materials in desired, predetermined, preselected patterned areas on textile materials which comprises: depositing powdered thermoplastic materials substantially uniformly in overall fashion on textile materials; directly contacting and pressing said powdered thermoplastic materials on said textile materials only in desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; applying heat to said textile materials and said powered thermoplastic materials adhered thereto from the side of said textile materials away from said powdered thermoplastic materials to assist in the compacting and densifying but not the melting and fusing of said powdered thermoplastic materials; removing powdered thermoplastic materials from said textile materials in the areas other than said patterned areas whereby said textile materials are capable of being adhered to other materials only in said patterned areas; and adhering said textile materials to other textile materials by means of heat and pressure applied to said thermoplastic materials in said patterned areas.

8. Apparatus for depositing powdered thermoplastic materials in desired, predetermined, preselected patterned areas on textile materials which comprises: means for de-positing powdered thermoplastic materials substantially uniformly in overall fashion on said textile materials; means for directly contacting and pressing said powdered thermoplastic materials on said textile materials only in the desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; and means for removing powdered thermoplastic materials from said textile materials in the areas other than said patterned areas.

9. Apparatus for adhering textile materials to other textile materials in desired, predetermined, preselected patterns which comprises: means for depositing powdered thermoplastic materials substantially uniformly in overall fashion on textile materials; means for directly contacting and pressing said powdered thermoplastic materials on said textile materials only in the desired, predetermined, preselected patterned areas approximately at room temperature and merely with sufficient pressure to compact and densify but not to melt and fuse said powdered thermoplastic materials and cause them to adhere to said textile materials only in said patterned areas without affecting the powdered materials in the areas other than said patterned areas, said compacting, densifying, and adhering being accomplished substantially solely by said application of pressure; means for removing powdered thermoplastic materials from said textile materials in the areas other than said patterned areas; means for applying heat at elevated temperatures to said textile materials to melt and fuse the powdered thermoplastic materials to adhere them more strongly to the textile materials after the powdered thermoplastic materials have been removed in the areas other than said patterned areas; and means for adhering said textile materials to other textile materials by means of heat and pressure applied to said thermoplastic materials in said patterned areas.

10. Apparatus as defined in claim 9 wherein the means for directly contacting and pressing said powdered thermoplastic materials is at approximately room temperature and said means for applying heat at elevated temperatures is in a range of from about 160° F. to about 320° F. and up to the melting and fusing temperature of said powdered thermoplastic materials.

References Cited

UNITED STATES PATENTS

| | | | |
|---|---|---|---|
| 396,220 | 1/1889 | Masters | 117—22 |
| 2,503,758 | 4/1950 | Murray | 117—37 R |
| 2,677,622 | 5/1954 | Schouteden | 117—21 |
| 2,820,716 | 1/1958 | Harmon et al. | 117—21 |
| 3,002,849 | 10/1961 | Harmon et al. | 117—21 |
| 3,079,290 | 2/1963 | Marshall | 161—148 |
| 3,150,023 | 9/1964 | Penman | 117—21 |
| 3,251,727 | 5/1966 | Reynolds et al. | 161—148 |
| 3,389,016 | 6/1968 | Holtz et al. | 117—11 |
| 2,721,153 | 10/1955 | Hope et al. | 117—212 |
| 948,572 | 2/1910 | Blaubach | 117—16 |
| 89,274 | 4/1869 | Batchelder | 117—22 |
| 3,198,648 | 8/1965 | Trimbur | 117—17.5 |
| 2,992,937 | 7/1961 | Davis | 117—3.1 |

FOREIGN PATENTS

| | | | |
|---|---|---|---|
| 968,667 | 9/1964 | Great Britain | 161—148 |
| 648,727 | 9/1962 | Canada | 117—37 |
| 971,434 | 9/1964 | Great Britain | 156—283 |
| 886,746 | 1/1962 | Great Britain | 156—283 |
| 908,216 | 10/1962 | Great Britain | 156—283 |
| 990,728 | 4/1965 | Great Britain | 156—283 |
| 1,024,126 | 3/1966 | Great Britain | 156—283 |

WILLIAM D. MARTIN, Primary Examiner

R. M. SPEER, Assistant Examiner

U.S. Cl. X.R.

117—16, 21, 25; 118—50, 60; 156—291, 548